United States Patent [19]
De Cremiers

[11] Patent Number: 6,100,964
[45] Date of Patent: Aug. 8, 2000

[54] METHOD AND A SYSTEM FOR GUIDING AN AIRCRAFT TO A DOCKING STATION

[75] Inventor: Michel De Cremiers, Paris, France

[73] Assignee: Sagem SA, Paris, France

[21] Appl. No.: 09/081,070

[22] Filed: May 19, 1998

[30] Foreign Application Priority Data

May 20, 1997 [FR] France ................................. 97 06123

[51] Int. Cl.[7] .............................. G01C 3/08; G08B 21/00
[52] U.S. Cl. ..................... 356/4.01; 340/958; 382/104; 382/216
[58] Field of Search ........................... 340/958; 356/4.01; 382/104, 216

[56] References Cited

U.S. PATENT DOCUMENTS

| | | | |
|---|---|---|---|
| 3,729,262 | 4/1973 | Snead et al. | 356/153 |
| 3,872,283 | 3/1975 | Smith et al. | 235/150.2 |
| 5,675,566 | 10/1997 | Richman et al. | 382/104 |

FOREIGN PATENT DOCUMENTS

| | | |
|---|---|---|
| 4009668 | 10/1991 | Germany . |
| 4238151 | 5/1994 | Germany . |
| 4301637 | 8/1995 | Germany . |
| 4406821 | 9/1995 | Germany . |

*Primary Examiner*—Stephen C. Buczinski
*Attorney, Agent, or Firm*—Larson & Taylor

[57] ABSTRACT

For guiding an airplane to a docking station in an airport, a two-dimensional thermal IR image of a station approach zone is formed from a determined point close to said docking station, Entrance of an airplane into the approach zone and locations of IR features of the landing gear of the airplane are detected on arrival of an airplane. The distance between the airplane and the station is computed from stored characteristics of the landing gear of the airplane expected at the station and from the locations as well as any difference between a current path followed by the airplane and a set path for the airplane to arrive at the docking station in a determined orientation. A system for implementing the method and displaying instructions for the aircraft pilot is also disclosed.

11 Claims, 4 Drawing Sheets

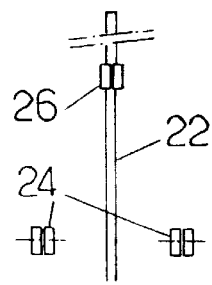
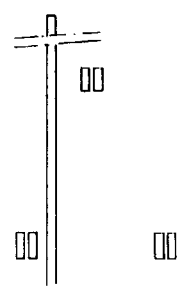
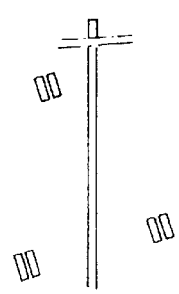

METHOD AND A SYSTEM FOR GUIDING AN AIRCRAFT TO A DOCKING STATION

BACKGROUND OF THE INVENTION

The present invention relates to methods and systems for guiding an aircraft to a docking station in an airport, serving to give the pilot of the aircraft visible indications enabling the pilot to reach the allocated docking station in safe and accurate manner.

Numerous systems have already been proposed for performing these functions. In particular, proposals have been made (WO 96/12265) for a system involving laser pulse scanning in association with a computer system. The airplane is initially identified by the appearance of echoes in sufficient number. Thereafter, it is tracked by laser telemetry. It can be identified by pattern recognition. Such a system is very sensitive to weather conditions and in particular to fog. In addition, it is very complex.

Proposals have also been made to use a stereographic system having video cameras aimed at the windscreen of the airplane cockpit (WO 96/09207). That system is very sensitive to weather conditions and also to variations in ambient lighting.

SUMMARY OF THE INVENTION

It is an object of the present invention to provide a guidance method and apparatus that satisfy practical requirements better than those known in the past, in particular by being highly insensitive to lighting and to weather conditions, and, above all, by making use of electro-optical components that are already in widespread use in other fields.

To achieve this result, a method of guiding an airplane to a docking station comprises the steps of:

forming a two-dimensional thermal IR image of an approach zone from a determined point close to the docking station;

detecting entrance into said approach zone and locations of characteristics of an infrared signature of the landing gear of an airplane in an image on arrival into said approach zone;

computing a distance between the airplane and the station from stored characteristics of the landing gear of the airplane expected at said station and from said locations, and computing a difference between a current path followed by the airplane and a set path for the airplane to arrive at the docking station in a determined orientation; and communicating indications to the pilot of the airplane concerning the difference between the actual position of the airplane and a set trajectory for reaching the docking station instructions on taxiing to said station, derived from a result of the calculation.

Advantageously, the infrared signature relies on parts of the airplane that exhibit thermal contrast after landing, such as the tires or other elements that are geographically distributed in suitable manner on the airplane.

By using an image in the thermal infrared, the method is insensitive to ambient lighting and to fog, and is therefore very reliable. Performing identification on the basis of the tires also provides numerous advantages. Since the relative spacing between the three wheel sets of the expected airplane is known, it is possible to deduce therefrom the distance to the airplane, and to do so with a degree of accuracy that is an increasing function of the spacing between the wheel sets. The tires of an airplane that has just landed are at a temperature that is higher than ambient, because of the braking, and this temperature difference varies little, thus making the tires easy to identify. Finally, hot spots can be detected in the image by using processing algorithms that are simple, that are already in widespread use in military fields, and that require only short computation times on a microcomputer such as a standard industrial computer.

In an advantageous embodiment, the indications or instruc-standard industrial computer.

In an advantageous embodiment, the indications or instructions are given to the pilot by means of a visual display placed close to the station. For example, the indications provided by the display may comprise the identity of the docking station to which the airplane is heading, the identity of the expected airplane (to be checked by the pilot), an indication of the distance between the airplane and the docking station, and an indication of the changes in heading that are required, in the form of the difference between the airplane's path and a set path, and/or an indication concerning the steering to be applied to the nose wheels.

One solution, which has the advantage of providing an indication that is clear and immediately usable, consists in giving the pilot a visual indication in the form of a vertical strip whose position relative to a midline of the display panel indicates the difference between the position of the nose wheels and their position on an ideal line of approach. Several strips of different colors (e.g. green, amber, and red) can be provided to specify whether the correction that needs co be performed is small, medium, or large. The indication given can take account of a predicted future path derived from successive images, and in particular from finding that the path is tending towards or away from the advised ideal line of approach.

To improve guidance accuracy when the airplane is close to the docking station, a second camera may be provided. However it is preferable to use a laser range finder that scans in two dimensions, and to use it to identify and track the nose of the airplane. Given that the laser telemeter is to be used at short range only, in practice at no more than 30 meters, its sensitivity to fog is no longer a drawback. Given that the approximate location of the nose can be deduced from the indications given by the thermal camera, a small range of azimuth scanning suffices. On the other hand, it is generally necessary to have a vertical scanning range of about 100° in order to track the airplane as it approaches.

By correlating the distance measured between the wheel images, and the distance measured to the nose of the airplane, it is possible to authenticate the airplane by look-up in a database containing the characteristics of the expected airplane.

Comparing the distance indications given by the computer on the basis of the infrared image and those given by laser telemetry make it possible to verify that the measurements are consistent and to avoid any possibility of a distance measurement error passing unnoticed.

The invention also provides a system for guiding an airplane to a docking station, apt to implement the above method, comprising:

a thermal camera placed close to the docking station and suitable for forming a two-dimensional image of an approach zone to the station;

means for extracting points and lines from the thermal image serving to identify the tires of the landing gear wheels of an airplane in the approach zone and to locate the positions thereof in the image;

computer means storing the characteristics of the airplane expected at the station and responding to said characteristics and said locations to supply the distance between the airplane and the station, and also the lateral difference between the instantaneous path of the airplane and a nominal path for airplane arrival at the docking station in a determined orientation; and means for giving the pilot indications concerning said difference or advice on taxiing towards the station, as reading the following description of a particular embodiment, given by way of non-limiting example.

The description refers to the accompanying drawings.

BRIEF DESCRIPTION OF THE DRAWINGS

FIG. 5 is a possible block diagram for the system;

DETAILED DESCRIPTION

Figure 1:
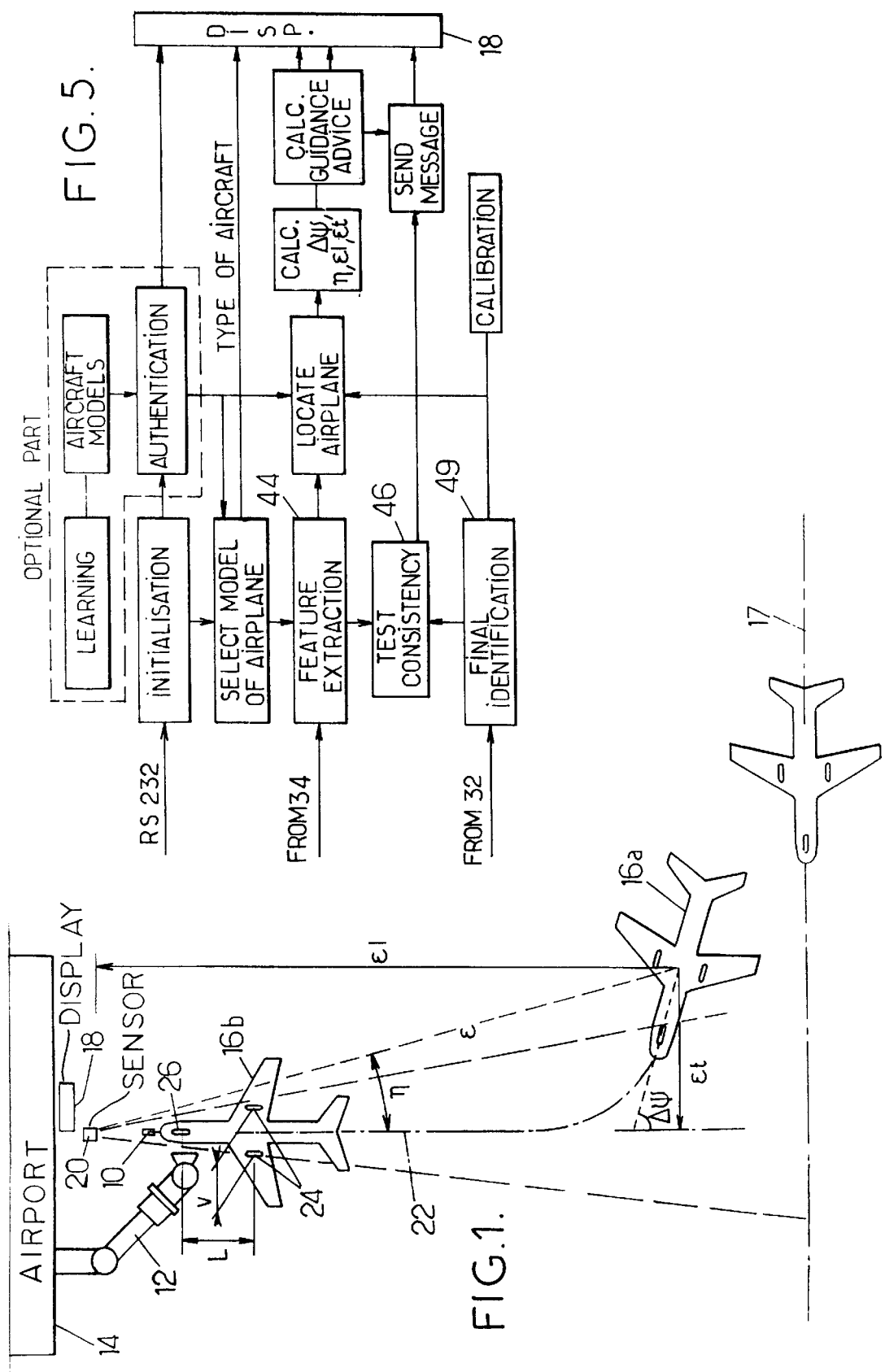
FIG. 1 is a schematic plan view showing the approach path of an airplane towards a docking station, and also showing the notation used.

FIG. 1 is a diagram of the docking station for an airplane, as indicated by a mark 10 on the ground; this mark indicates, for example, the optimum location for bringing a gangway 12 of an airport 14 for embarkation and disembarkation against the airplane. An airplane which has just landed is allocated to a particular docking station, which it reaches initially by following a taxiway 17, and then by following a path which brings it, in a determined orientation, to the location indicated by the mark 10, as shown in FIG. 1. An airplane that is to come up to the docking station shown in FIG. 1 leaves the taxiway and turns towards the airport, e.g. takes up successive positions as shown at 16a and 16b.

Figure 2:
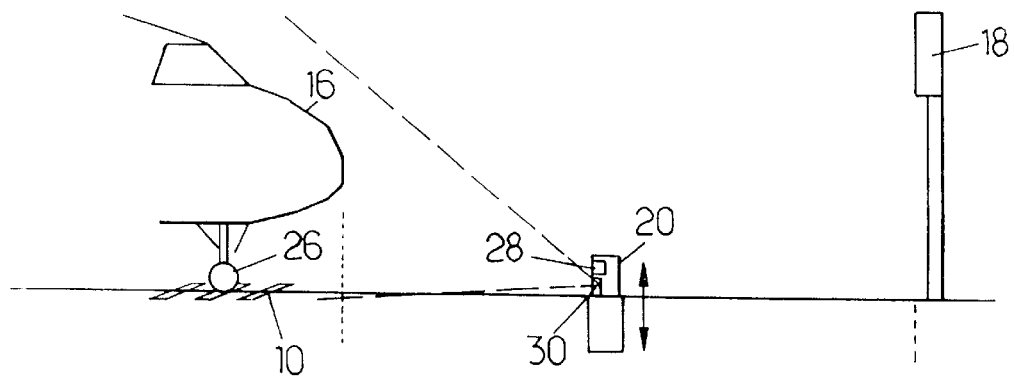
FIG. 2 is an elevation view showing the location of a display panel and of a sensor unit relative co the docking station.
Figure 3:
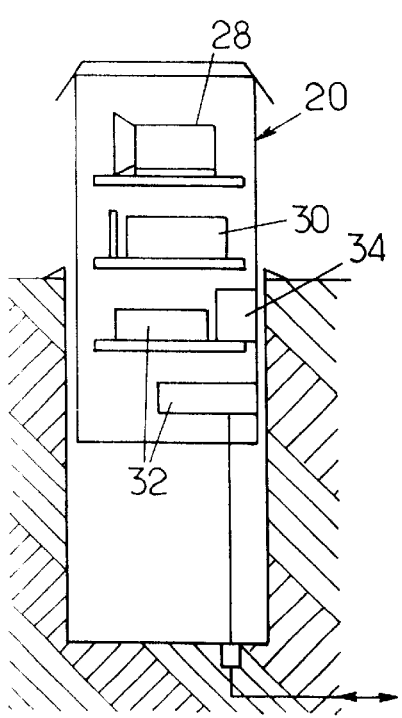
FIG. 3 is a diagrammatic elevation view showing one possible structure of the sensor unit.

As in already-existing systems, each docking station is provided with a display panel 18 (FIGS. 1 and 2) placed at a sufficient height above the ground to be easily viewed by a pilot (in general 4 to 6 meters up).

The system comprises a sensor unit 20 placed above the ground between the docking station and the terminal building. In an advantageous embodiment, it is contained in a post that may optionally be retracted into a housing in the ground when it is not in use. The sensor unit 20, processor members that are described below, and the display panel 18, together make it possible to perform at least the following functions:

azimuth (or lateral) guidance, giving information helping the pilot to bring the airplane onto a reference approach path, generally marked on the ground by a straight line 22 (FIG. 1); and approach guidance, telling the pilot how much distance remains to be covered before the final stop.

As a general rule, the distance between the taxiway 17 and the parking station lies in the range 80 meters to 100 meters, and airplanes can arrive equally well from the left or from the right.

As already mentioned above, and at least at the beginning of guidance, the sensor unit essentially makes use of an image of the locations of the tires of an approaching airplane 16. As a general rule, close guidance takes place only when the distance between the airplane and its parking station is less than some determined value, e.g. 15 meters.

Azimuth guidance is based on recognizing the tires of the airplane which begins an approach. The difference in position between the main wheel sets 24 and the nose wheels 26 of each airplane likely to dock are scored in the computer center of the airport. When the control tower has assigned an airplane to a particular docking station, the type of airplane is to a particular docking station, the type of airplane is communicated to a guidance computer specific to the docking station, which computer already contains the airplane characteristics.

The sensor unit 20 comprises at least one thermal camera 28, generally operating in the 8 $\mu$m to 12 $\mu$m band, having a small horizontal angular field, generally lying in the range 12° to 20°. This field gives good definition as the airplane approaches its parking station while nevertheless covering a. field that is sufficient, at a range of about 100 meters, for identifying the tires of airplanes taxiing on the taxiway 17 or beginning to move onto the line 22. It is possible to use existing cameras having a matricial detector, which cameras can be installed without difficulty in a post located at about 10 meters from the parking station on line 22. In general, the elevation field of the camera can be small since, as a general rule, only the tires are observed. This also makes it possible for the camera to be placed, while in operation, at a low height above the ground, and to restrict the extent to which the post projects to a few tens of centimeters.

As shown, the sensor unit also contains a scanning laser range finder 30, of a type that is already available for three-dimensional measuring applications outdoors, giving distance accuracy of ±10 cm and having a range of about 50 meters in clear weather. The range of such a range finder, e.g. operating at 0.9 $\mu$m, is smaller in the event of fog, but it nevertheless remains sufficient to guide the airplane at the end of its taxiing. The range finder 30 can be designed to perform vertical scanning over a range of about 100° and to be steerable transversely over a range of a few degrees on either side of the line 22.

Figure 4:
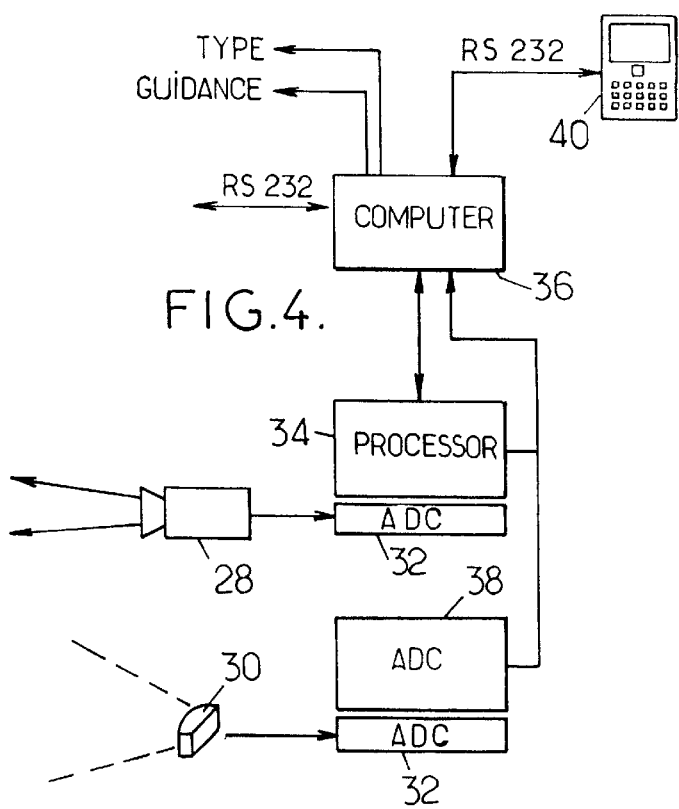
FIG. 4 is a block diagram of the links between the elements of the sensor unit and a guidance computer.

The post may also contain service means 32 and a motor 34 for raising and lowering the post, e.g. by driving a pinion Both sensors (infrared camera 28 and scanning laser telemeter 30) are connected to preprocessing electronics. In the example shown in FIG. 4, each sensor feeds an analog-to-digital converter 32. The digitized image from the camera 28 is processed by an image processor 34 serving to identify the locations of the tires and to deliver their coordinates in the image to a guidance computer 36. During final approach, this computer also receives distance data as provided by a circuit 38 for acquiring and preprocessing the information supplied by the laser telemeter 30.

A unit 40 for monitoring and control by a human operator may be provided for emergency use in the event of failure of the computer network. This unit serves to deliver the necessary elements for operation of the guidance computer 36, in particular the identity of the expected airplane and its characteristics, i.e. the distances between its wheel sets.

When a laser range finder 30 is used to measure the distance of the nose of the airplane from the docking station, the information given to the computer also includes the height of the nose and the horizontal distance between the nose wheels and the nose, so as to enable comparison to be performed taking account of the fact that the measured distance is that to the nose of the airplane while the computed distance is that to the main wheel sets or to the nose wheels.

The block diagram of the processing performed by the system can be as shown in FIG. 5, where the portions in dashed line boxes which correspond to authenticating the identity of an expected airplane are optional.

Figure 7A:
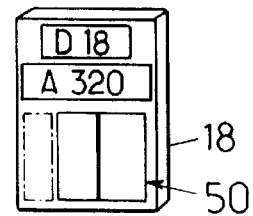
FIGS. 7A to 7E show the appearance of the display panel under various approach conditions.
Figure 7B:
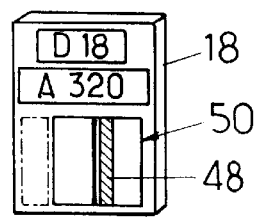
Figure 7C:
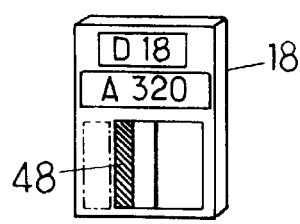
Figure 7D:
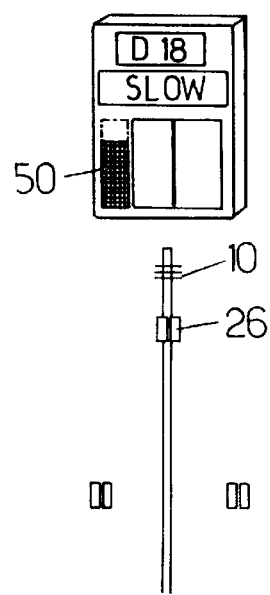

When an airplane lands, the pilot knows which docking station to go to. The control tower indicates to the computer 36 of said station, via the computer network of the airport, the landing time of the expected airplane and its type (if the characteristics of all airplanes likely to be received are already stored in the computer), or else it supplies the characteristics of the airplane (wheel base L, track or tread v, height of nose above the ground, horizontal distance between nose and nose wheel set, etc.). After such initialization, the display panel 18 is controlled by the computer to inform the pilot of the type of airplane expected, thereby enabling visual checking to be performed; an area is reserved for this purpose on the display panel 18 (FIGS. 7A to 7C).

The unit 20 is then lifted from its housing and the thermal camera 28 is activated prior to the expected arrival tine. The camera senses airplanes on the taxiway 17 as they come into its field of view at a distance which is known. The locations of the tires are detected by extracting characteristic points and lines from the thermal image at 44 and by testing for consistency with the stored characteristics at 46. Two results are thus obtained.

Firstly, by comparison with the memorized data, it is possible to make a provisional identification.

Secondly, it is possible to distinguish the nose wheels from the main wheel sets, and by subsequently tracking them, it is possible to continue distinguishing them in the image.

Start of Approach

When the provisionally identified airplane begins to turn towards the line 22, analysis of the image provided by the camera makes it possible to measure the difference $\epsilon t$ (lateral error) and also, by comparing L and v with the distances between the wheels in the image, it is possible to measure the angle $\Delta\Psi$ between the axis of the airplane and the line 22 (heading error). It is also possible to calculate the angle $\eta$, i.e. the azimuth bearing of the airplane relative to the line 22. By making comparisons between successive images taken at time intervals dt, the taxiing speed V of the airplane can be calculated from the formula $d\epsilon t/dt = V \cdot \sin \Delta\Psi$.

The camera 28 and the guidance computer 36 thus serve to provide the indications that are to be displayed on the panel 18. These indications can be displayed in a wide variety of forms.

In the particular case shown in FIGS. 7A to 7E, during the distant approach stage, these indications comprise a plurality of vertical strips 48. The position of the strip that is lighted relative to the middle of an area 50 informs the pilot about the steering to be given to the steerable nose wheels.

In FIG. 7A, the vertical strip coincides with the middle line or is absent.

In FIG. 7B, the position of the strip tells the pilot that it is necessary to turn slightly to the left (port).

In FIG. 7C, which corresponds to the case of an airplane which has already turned to the left and is going even further away from the set path, the presence of the strip on the far left tells the pilot to steer hard right (starboard).

The computer may be designed to display the word STOP in the aircraft identity display position in the event of the difference being so great as to be incapable of being corrected.

In practice, the display can be no more than three strips on either side of the middle line, with each strip being of a different color, e.g. green when close to the middle line for a small correction, amber for a medium correction, and red for a large correction.

Final Approach

When the distance $\epsilon 1_c$ as estimated from the thermal image with relatively low accuracy $\delta_c$ becomes less than some predetermined value, e.g. 30 meters, the laser range finder 30 is put into operation. At this stage, the approaching airplane has been identified provisionally only. By using the information supplied by processing the thermal image and the stored data, the search for the nose of the airplane (the point closest to the parking station) can be restricted to a domain that is narrow in azimuth. Points and lines characteristic of the airplane can be identified, e.g. in vertical cross-section, at 49. In the absence of acquisition, a STOP message may be displayed.

Figure 7E:
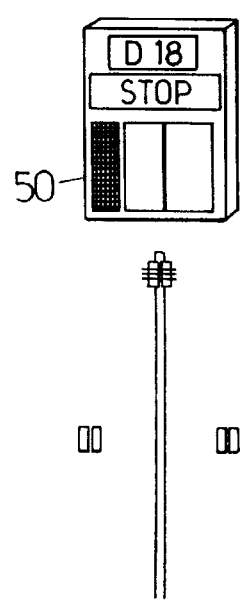

In normal operation, distance begins to be displayed on the panel 18, together with a consistency test being performed at 46. Under the circumstances shown in FIGS. 7D and 7E, the lefthand portion of the panel 18 constitutes an approach bar 50 which appears when the airplane is at a distance from the docking station that is less than some determined value, and which frows progressively up to the final stop of the airplane. FIG. 7B corresponds to the case of the airplane being properly aligned and approaching the mark 10 at excessive speed. The computer then displays advice to slow down (SLOW). Finally, the signal STOP appears when the airplane is in position (FIG. 7E).

Figure 6:
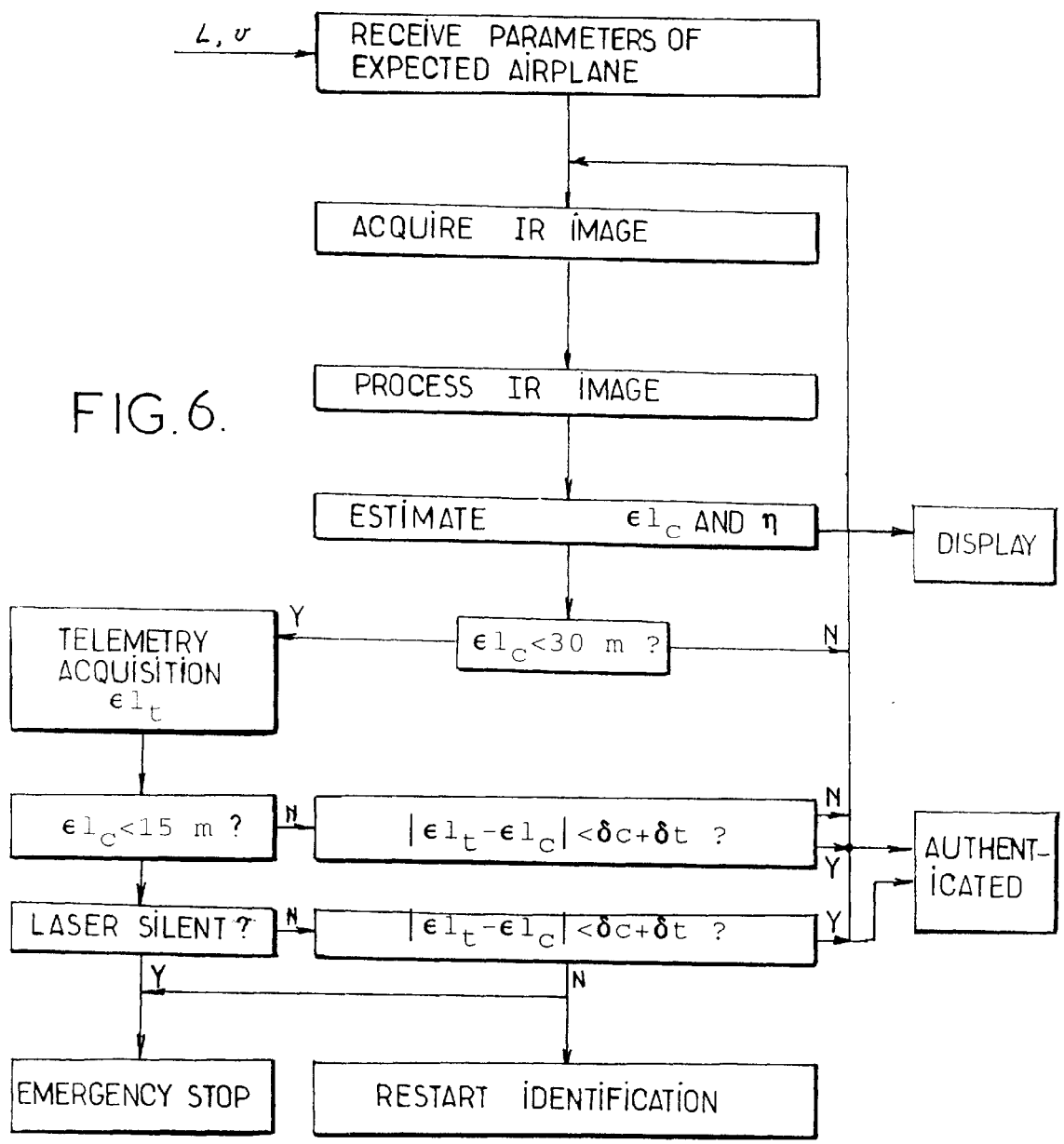
FIG. 6 is a flow chart of the method implemented by the system.

FIG. 6 is an example of a flow chart usable in authenticating and visually guiding an airplane in a system of the kind described above, using a thermal image and telemetry.

FIG. 6 begins with initialization (receiving the parameters of the expected airplane). A loop is then run so long as the estimated distance co the airplane $\epsilon 1_c$ is greater than a determined value, e.g. 30 meters; the loop rate may be run at about 20 Hz. Acquisition comprises generating the infrared image, processing said image, and estimating $\epsilon 1_c$ and $\eta$.

At less than $\epsilon 1_c = 30$ meters, the computer 36 takes account of the information delivered by the laser telemeter, with the computer giving the range information facilitating its search for the airplane, and in particular for its nose which is the nearest point thereof. The accuracy $\delta_t$ with which the distance $\epsilon 1_t$ is evaluated in this way, (a few tens cm), is better than the accuracy $\delta_c$ that results from computation based on the thermal image. The computer thus has two distance values available: $\epsilon_{1c}$ and $\epsilon 1_t$.

Distance tests on $\epsilon 1_c$ are continued, with distance guidance beginning only when the distance $\epsilon 1$ is less than some other value, smaller than the first, e.g. 15 meters.

So long as $\epsilon 1$ is greater than 15 meters, only a consistency test 60 is performed. It consists in verifying that the difference between the two values $|\epsilon 1_t - \epsilon 1_c|$ is less than $|\delta_t + \epsilon_c|$ (if a value $\epsilon 1_t$ is available). The values of $\epsilon_1$ that are actually compared take account of the distance between the corresponding points on the airplane which are aimed at, i.e. the distance between the nose and nose wheels.

When the result of the test is "ok", it can be assumed that the identity of the airplane has been authenticated. This authentication can be confirmed by comparing a memorized shape with the vertical profile of the airplane as given by scanning the laser.

When $\epsilon 1$ becomes less than 15 meters, verification is performed on the laser. If it gives no indication, an emergency "STOP" order is issued and displayed on the panel 18. otherwise, if a measurement is available, a new test 62 comparing the difference between the measurements and the sum of the limit accuracies, identical to test 60, is performed.

If the difference is excessive, the identification process is restarted and simultaneously a STOP signal is displayed. guidance is performed as described above until the airplane has stopped at the docking station.

What is claimed is:

1. A method for guiding an airplane to a docking station in an airport, comprising the steps of:

(a) forming a two-dimensional thermal IR image of a station approach zone from a determined point close to said docking station;

(b) detecting entrance of an airplane into said approach zone and locations of characteristic features of an infrared signature of the landing gear of said airplane which characteristic features exhibit thermal contrast and which appear as hot spots in said IR image on arrival of said airplane into said approach zone;

(c) computing a distance between the airplane and the station from stored characteristics of the landing gear of the airplane expected at said station and from said locations and computing a difference between a current path followed by the airplane and a set path for the airplane to arrive at the docking station in a predetermined orientation; and (d) communicating indications to the pilot of the airplane concerning the difference between the actual position of the airplane and a set trajectory for reaching the docking station instructions on taxiing to said station, derived from a result of the calculation.

2. Method according to claim 1, wherein during step (c) the infrared signature of landing gear is derived from location of tires thereof.

3. Method according to claim 2, wherein the tires belonging to nose wheels of the airplane and the tires belonging to main wheel sets of the airplane are identified by an analysis of said infrared image first when the airplane is seen laterally and then by tracking.

4. Method according to claim 2, further including, during step (c) and after the distance computed from analysis of a thermal image has been found lower than a predetermined value, measuring a distance between the airplane and the docking station by laser telemetry and confirming indication given by telemetry by comparing said indication with the computed distance.

5. Method according to claim 4, further comprising determining a vertical profile of the airplane by scanning telemetry and identifying the airplane which is approaching by comparing said vertical profile with a predetermined stored vertical profile.

6. Method according to claim 5, including further identification of the airplane by comparing distance indications obtained by telemetry and distance information derived from analysis of the infrared image.

7. A system for guiding an airplane to a docking station comprising:

a thermal camera placed close to the docking station and suitable for forming a two-dimensional image of an approach zone to the station;

means for extracting points and lines from the thermal image belonging to wheels and tires of the landing gear of an airplane in the approach zone which points and lines appear as hot spots in the thermal image and which are based on a thermal contrast of the wheels and tires of the airplane, and to locate the positions of the points and lines in the image;

computer means storing the characteristics of an airplane expected at the station and responsive to said characteristics and said locations to supply the distance between the airplane and the station, and also a lateral difference between the instantaneous path of the airplane and a nominal path for airplane arrival at a docking station in a determined orientation; and means for giving indications readable by a pilot of the airplane concerning said difference or advice on taxiing towards the station, as derived from results of a computation by said computer means.

8. System according to claim 7, wherein said computer means are programmed for identifying the tires of nose wheels and of main wheel sets of the landing gear.

9. System according to claim 8, further comprising a laser range finder with vertical scanning for measuring a distance between a nose of the airplane and comparing said distance with a value computed from information derived from the infrared image.

10. System according to claim 7, wherein said means for giving indications to the pilot comprise a display panel carrying an indication of the type of an expected airplane and of a difference between an actual path of the airplane and a set approach path.

11. System according to claim 10, wherein said display panel comprises a zone having a vertical mid-line and individually strips located on either side of the vertical line lightable for indicating an error as to the location of north wheels with respect to a set path or a direction into which the nose wheel should be steered.

* * * * *